United States Patent [19]

Tatum, Jr. et al.

[11] Patent Number: 5,080,773
[45] Date of Patent: Jan. 14, 1992

[54] GROUND ELECTRODE BACKFILL

[75] Inventors: Joseph F. Tatum, Jr.; Thomas H. Lewis, Jr., both of Hattiesburg, Miss.

[73] Assignee: Cathodic Engineering Equipment Co., Inc., Hattiesburg, Miss.

[21] Appl. No.: 680,751

[22] Filed: Apr. 5, 1991

Related U.S. Application Data

[62] Division of Ser. No. 522,035, May 11, 1990, Pat. No. 5,026,508.

[51] Int. Cl.⁵ .................... C23F 13/00; H01R 4/66
[52] U.S. Cl. .................... 204/196; 204/197; 204/147; 204/148; 174/6; 252/502
[58] Field of Search ............ 204/196, 197, 147, 148; 174/6; 252/502

[56] References Cited

U.S. PATENT DOCUMENTS

| | | | |
|---|---|---|---|
| 2,553,654 | 5/1951 | Heise | 174/6 |
| 3,573,427 | 4/1971 | Minsk | 252/503 |
| 3,725,669 | 4/1973 | Tatum | 174/6 |
| 3,941,918 | 3/1976 | Nigol et al. | 252/502 |
| 3,962,142 | 6/1976 | Freeman et al. | 174/6 |
| 4,544,464 | 10/1985 | Bianch et al. | 204/196 |
| 4,676,377 | 11/1988 | Tatum, Jr. | 174/6 |
| 4,786,388 | 11/1988 | Tatum, Jr. | 174/6 |
| 4,806,272 | 2/1989 | Wiley | 252/511 |
| 4,994,629 | 2/1991 | Tatum, Jr. et al. | 174/6 |

FOREIGN PATENT DOCUMENTS

| | | |
|---|---|---|
| 0044233 | 11/1978 | Japan . |
| 0126282 | 10/1981 | Japan . |
| 1445611 | 8/1976 | United Kingdom . |
| 1476081 | 6/1977 | United Kingdom . |

Primary Examiner—Josephine Barr
Assistant Examiner—Bradley A. Swope
Attorney, Agent, or Firm—Dowell & Dowell

[57] ABSTRACT

A low resistance non-permeable backfill especially for use in vertical anode beds for the cathodic protection of subsurface metallic structures includes a mixture of portland cement, calcined fluid petroleum coke, micro-size carbon rods and high structure carbon black.

36 Claims, 1 Drawing Sheet

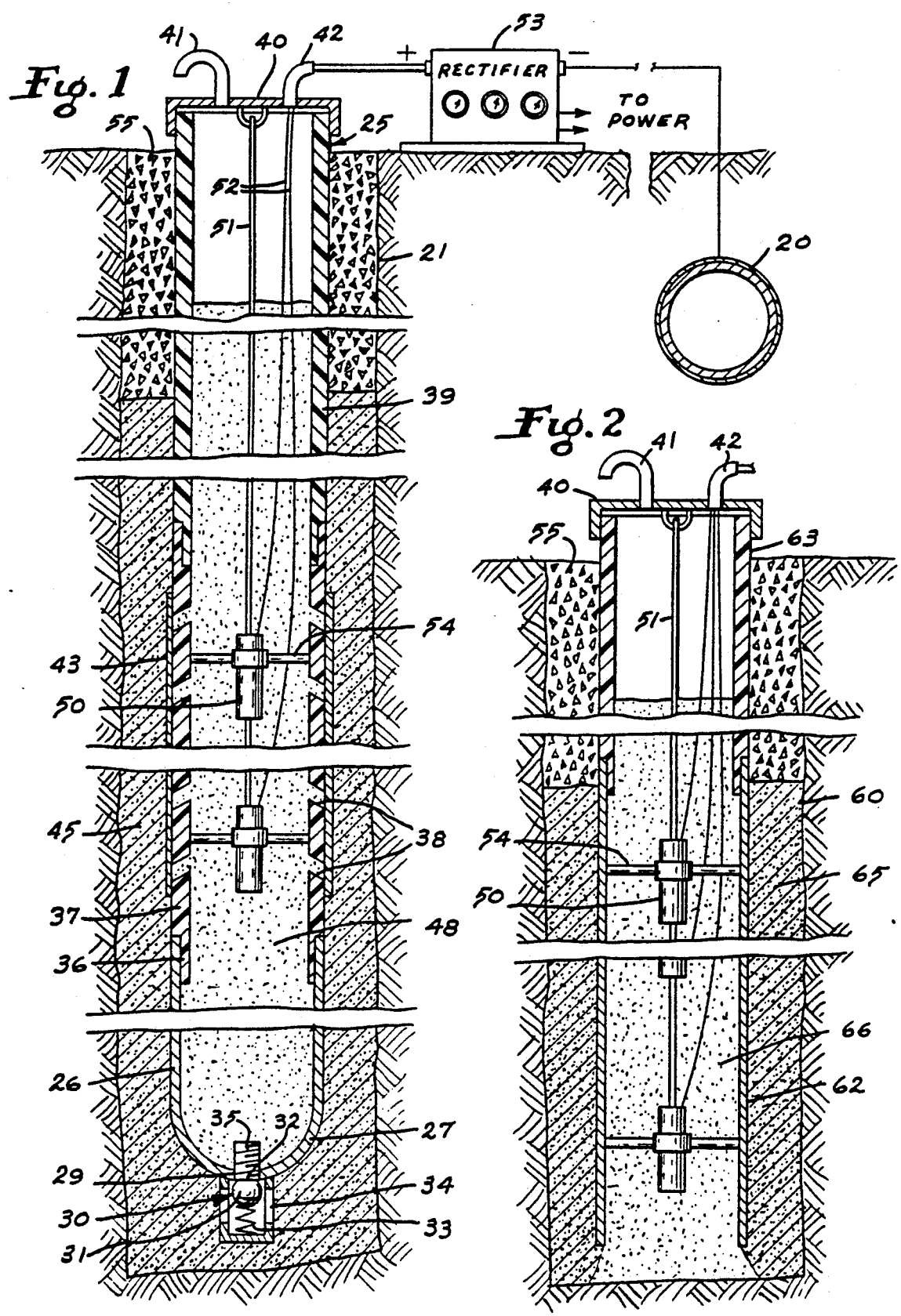

GROUND ELECTRODE BACKFILL

This application is a division of application Ser. No. 07/522,035, filed May 11, 1990 now U.S. Pat. No. 5,026,508.

BACKGROUND OF THE INVENTION

This invention relates to electrically conductive portland cement mixtures and particularly to backfill materials for ground bed anodes such as those described in U.S. Pat. No. 3,725,669 to Joe F. Tatum and U.S. Pat. No. 4,786,388 to Joseph F. Tatum, Jr.

The well-known practice of using deep well anode beds to prevent corrosion and rapid deterioration of subsurface metallic structures is referred to in those patents.

In deep well cathodic protection systems the wells may run from fifty feet to several hundred feet deep. Such wells may pass through one or more strata of water. In such case the installation of the well may provide a passage between one or more water layers, and possibly a porous layer. In either situation the possibility of contamination between layers is possible. Such contamination may result in undesirable effects and be contrary to environmental considerations.

Accordingly, in U.S. Pat. No. 4,786,388 a backfill composition is described which includes a portland cement so that a solid, non-porous, backfill is provided which does not permit the transfer of liquids between different levels. In order to provide the backfill composition with the required characteristic of conductivity, the portland cement is mixed with calcined fluid petroleum coke and with naturally occurring graphite flakes or graphite powder. The use of the coke requires a high proportion thereof with the result that the cement composition may not always set as much like conventional cement as desired. Furthermore, the ability of the graphite to conduct current is of a limited nature. In addition, a surfactant is required to facilitate pumping of the material.

It will be apparent, therefore, that the use of conductive substances tends to detract from the quality of the cement product. Hence the selection of conductive materials which will provide a high level of conductivity at low levels of proportion is desired in order that high cement quality may be maintained.

DESCRIPTION OF THE PRIOR ART

The Tatum U.S. Pat. No. 3,725,669 describes one type of system or environment for which the backfill of the present invention is particularly adapted.

The United States patent to Tatum, Jr., U.S. Pat. No. 4,786,388 describes an electrically conductive backfill having a cement component in order to produce ground bed apparatus having a non-permeable concrete annulus in contact with the earthen bore of the ground bed.

The United States patent to Freeman et al. discloses a setable composition including a cementitious material and an aggregate which includes carbonaceous material of at least two types, one type being relatively large carbonaceous particles and the other type being relatively small carbonaceous particles. Examples of the relatively large carbonaceous particles are calcined oil coke. An example of the relatively small particles is acetylene black.

The United States patent to Nigol et al., U.S. Pat. No. 3,941,918 discloses a cement for mechanically and electrically joining metal hardware to an insulator shell, the cement including portland cement admixed with graphite fibers and high structure carbon black.

The United States patent to Wiley, U.S. Pat. No. 4,806,272 discloses a conductive coating or application to concrete or other building materials which coating includes coke in a resin binder. The United States patent to Minsk U.S. Pat. No. 3,573,427 discloses an electrically conductive asphaltic concrete which has graphite particles incorporated therein.

British Patents Specifications Nos. 1,445,611 of 1976, and 1,476,081 of 1977 disclose setable concrete compositions which include electrically conductive particulate carbonaceous materials.

SUMMARY OF THE INVENTION

The present invention provides a setable concrete composition in which the proportion of cement is relatively high so that the resulting product will set similar to conventional mixtures and in which specific conductive substances are employed whose combination provides an enhanced level of conductivity so that an unexpectedly higher conductivity is achieved. In accordance with the present invention a relatively high level of portland cement is combined with a relatively low level of calcined fluid petroleum coke, the primary conductive medium, and much smaller amounts of bridging conductive materials which facilitate the current flow between the coke particles. The bridging materials selected are micro-carbon rods and high structure, electrically conductive, carbon black, both preferably of selected specifications.

The micro-carbon rods are preferably rigid and range in diameter from 6 to 14 microns and in length from 30 to 600 microns, and have a carbon content of approximately 98.5 to 99.8%.

The carbon black of high electrical conductivity has a surface area ranging from 200 to 1500 square meters per gram, a high structure ranging from 150 to 500 cubic centimeters per 100 grams and a low volatile content ranging from 0.5 to 2.0% by weight.

The conductive backfill of the present invention is especially adapted for, but not limited to, use in a vertical anode ground bed of the type described in the Tatum U.S. Pat. No. 3,725,669 and the Tatum U.S. Pat. No. 4,786,388. Such use would include the production of ground bed apparatus having a non-permeable concrete annulus in contact with the earthen bore of the ground bed. Such concrete annulus would enable one to avoid water quality degradation while at the same time achieving a low resistance ground contact through non-permeable material. The material may be used on the outside of a casing and conventional anodes and carbonaceous backfill used on the inside of the casing. A surfactant is not required.

Through the use of the non-permeable but conductive backfill or grout on the outside of the casing, contamination or degradation of water quality from the transfer of fluid material from one water bearing structure to another or to a porous strata or from the ground surface to a water bearing structure may be avoided.

BRIEF DESCRIPTION OF THE DRAWINGS

FIG. 1 is a vertical section of a deep anode bed for cathodic protection, illustrating its electrical connection to the remainder of a conventional system, and illustrating the backfill of the present invention in an environment as described in the Tatum U.S. Pat. No. 3,725,669, and Tatum, Jr. U.S. Pat. No. 4,786,388.

FIG. 2 is a vertical section of a deep anode bed illustrating the use of the backfill of the present invention in an alternative environment, as described in the Tatum, Jr. U.S. Pat. No. 4,786,388.

DESCRIPTION OF THE PREFERRED EMBODIMENTS

Calcined fluid petroleum coke is especially advantageous for use as a backfill material due to its characteristic hard round-grain uncrushable shape. Such shape is particularly advantageous in the manufacture of non-porous yet easily applied conductive grout. In accordance with the present invention its use with portland cement in a manner such that it will set as naturally as possible, and have high electrical conductivity is provided.

Thus, the improved composition of the present invention includes a mixture of portland cement, calcined fluid petroleum coke, micro-carbon graphite rods, and high structure, electrically conductive, carbon black. Such composition, formulated as will be described, has greatly enhanced electrical conductivity, decreased porosity, and sets up very similar to conventional concrete.

The material must be conductive in order to function, as for example, in an earth contact backfill. The material is used to seal off earth strates, therefore, decreased porosity is of importance.

Since the water industry uses cement in practice in protecting underground water quality, the fact that applicant's composition sets similar to cement improves the likelihood of its acceptance in the water industry for preventing water quality degradation.

As a result of experimentation we found that by using a blend of calcined fluid petroleum coke, very small diameter and short but strong graphite rods, and the addition of carbon black we could increase the percentage of portland cement in order to enhance the non-porous characteristic of the composition, to provide an earth contact backfill which performs a sealing function, and, which has a greatly improved conductivity.

The carbon black which is used is of particularly fine grain and low volatility and greatly enhances the conductance between the calcined fluid petroleum coke particles. The graphite rods, in that they are rigid, also enhance the contact between the calcined fluid petroleum coke particles.

An example of a composition in accordance with the present invention is as follows:

| Portland (API Class A) Cement | 30–50% by weight |
| Calcined Fluid Petroleum Coke | 50–70% by weight |
| Graphite Rods | 0.05–5.0% |
| Carbon Black | 0.05–5.0% |

In the composition the fluid petroleum coke should preferably be sized less than 16 mesh. (Tyler standard 16 sieve).

The graphite rods are commonly referred to as microcarbon rods. An example is a product described as Microcarbon 90 produced by Fibertec of Bridgewater, Mass. Its specifications include a length distribution in which 1% is less than 10 microns, the mean is 100 microns, and 1% is more than 460 microns. The minimum filament diameter is 8 microns, the nominal is 15 microns and the maximum is 28 microns. It is of high purity, being free of any foreign matter, oil or grease. The product has a bulk density of approximately 0.165 grams per cc and a resistivity of approximately 1375 micro-ohm-cm at 0° C.

It has been found that preferred results are obtained if the micro-rods range in length from 30–600 microns, the diameter 6–14 microns, and the carbon content from 98.5 to 99.8%.

An example of a carbon black product having the qualities required for use in the present invention is Vulcan XC-72 which is produced by the Cabot Corporation of Boston, Mass. The company's specifications describe the product as having the lowest electrical resistivity, an apparent density of 6–16 pounds per cubic foot, a surface area of 254 square meters per gram, and a mean particle size of 30 millimicrons. The product also is specified as having a volatile content of 2.0% and fixed carbon of 98.0%.

A carbon black ranging from 200 to 1500 square meters per gram, a structure of 150 to 500 cubic meters per 100 grams and a volatile content of 0.5 to 2.0% by weight is preferred in the practice of the present invention. The surface area and structure are indicative of the physical properties of the carbon black and its degree of conductivity. The surface area is indicative of the size of the primary particle and its porosity. Higher surface area carbon has more aggregate or particles per unit weight thus resulting in smaller inter-particle distances and therefore are generally more electrically conductive.

Structure, as defined by the dibutylphthalate (DBP) absorption test, indicates the number of particles which make up the primary carbon black aggregate and its shape. High structure particles have large highly branched clusters which increases inter-particle contact resulting in higher electrical conductivity.

It is recognized that in a given volume of carbon black the empty space or void volume is unusually large. Thus, in carbon black at a density of 2–3 pounds per cubic foot (32–48 grams per liter), the density value for most blacks upon recovery, the void volume is 97–98%, based on a specific weight of the particles of 1.9. These voids appear to be indicative of the carbon black structure, or in other words the degree of particle aggregation.

In the present application it is believed that the particular nature of the carbon black and the micro-carbon rods provide a bridging between the calcined fluid petroleum coke particles that is especially conductive. Thus, it is believed that with the high structure and high surface area carbon black particles of very small size there are many parallel contact points between adjacent particles.

Because of the non-porous nature of the resulting concrete, it is not intended for use directly on an anode's surface. Therefore, it is intended that cathodic protection systems will utilize a standard carbonaceous material within the confines of the casing and would use the backfill of this invention on the outside of the casing in order to comply with environmental laws for the sealing of strata.

A preferred environment for the invention is described in the Tatum U.S. Pat. No. 3,726,669 and Tatum, Jr. U.S. Pat. No. 4,786,388. The present invention is an adaptation to and of the invention described in those patents. Accordingly, the present inventors make no claim of inventorship in the subject matter of those patents. The disclosure herein of material from those patents is used as an illustration of the subject matter or environment with which the present invention may be employed.

With continued reference to the drawings, a steel pipeline or other metallic underground structure 20 is provided which must be protected from corrosion to increase the life of such structure, as well as to reduce maintenance thereon. In order to prevent or reduce corrosion on the pipeline 20, a deep well ground bed is formed by drilling a bore hole 21 to any required depth, such as 200 to 250 feet in a typical situation.

After the bore hole has been drilled, a casing 25 of a diameter less than the diameter of the bore hole is lowered into such bore hole. The casing 25 is of a length to rest on the bottom of the bore hole, extend the full length thereof, and terminate slightly above the surface of the ground. The casing 25 includes a tubular base portion 26 constructed of iron, steel, or other metal having a bottom wall 27 and with the upper end being open. The bottom wall 27 of the base portion is provided with an opening 29 in which a check valve 30 is received. Such check valve includes a ball 31 normally urged into engagement with a seat 32 by means of a spring 33. A plurality of slots 34 around the lower portion of the check valve permits material to be discharged through the check valve into the area surrounding the casing 25. The upper portion of the check valve 30 extends into the base portion 26 and is provided with threads 35 for a purpose which will be described later.

The open upper end of the metallic base portion 26 receives and is connected to a reduced end 36 of a lower pipe section 37 of the casing. The lower pipe section is provided with a plurality of openings 38 with each of the openings being angularly disposed from a lower outer position to an upper inner position and extending entirely through the wall thickness of the lower pipe section. A plurality of imperforate upper pipe sections 39 are connected to the lower pipe section and extend upwardly to a position above the surface of the ground. The lower pipe section 37 and each of the upper pipe sections 39 are constructed on an inert thermoplastic material which is chemically stable in the present of oxygen, hydrogen, chlorine, strong acids and strong bases, and is not subject to deterioration from concentrated electric fields.

A cap 40 is fixed to the upper end of the casing 25 and such cap includes a vent 41 and an electrical conduit inlet 42. A sleeve 43, which preferably is constructed of sheet steel or other conductive material, is disposed about the lower pipe section 37 in a position to initially cover the openings 38 to substantially prevent the ingress of foreign material into the casing.

As the casing is lowered into the bore hole, such casing will displace a substantial quantity of the mud and cause the mud to be discharged from the top of the bore hole. After the casing 25 is in place at the bottom of the bore hole 21, a wash pipe, not shown, is threadedly connected to the threads 35 of the check valve 30 so that such wash pipe extends entirely through the casing 25.

With the casing 25 in position, one end of a hose, not shown, is connected to the upper end of the wash pipe and the opposite end is connected to a source of clean water under pressure so that such water is introduced into the wash pipe. Water under pressure opens the check valve 30 and is discharged through the slots 34 into the bottom of the bore hole until the fluid being discharged at the top is substantially clear and most of the mud has been removed.

When the water being discharged from the bore hole 21 is substantially clear, the hose is disconnected from the water supply and is connected to a hopper (not shown) containing water in which the backfill mixture 45 of the present invention is suspended or fluidized. The slurry of water and such backfill mixture is introduced under pressure into the wash line and is discharged through the check valve 30 into the space between the bore hole 21 and the casing 25. The injection of such material continues until the upper level of such material is located at an approximate level above the uppermost openings 38, which may be approximately 100 to 120 feet above the bottom of the bore hole in a typical situation. The hose is then disconnected from the carbonaceous material supply hopper and is connected to a source of water under pressure so that the backfill material within the wash line will be discharged exteriorly of the casing 25. Meantime, the cementitious backfill mixture of the present invention begins to setup or harden.

When the surplus backfill material has all been discharged from the wash line, such wash line disconnected from the check valve 30 is separated therefrom by a few feet. The check valve 30 will prevent the cementitious backfill material and any surplus water located exteriorly of the casing from entering the bottom of the casing.

Clear water under pressure then is introduced into the wash line to remove any mud or foreign matter which has seeped into the casing, after which the wash line is removed. A plurality of anodes 50 of high silicon cast iron, graphite, carbon or steel material are mounted on a support line 51 of an inert material such as nylon or the like having poor electric current carrying qualities. The anodes 50 are connected by well insulated electrical conduits 52 to the positive side of a rectifier 53. The negative side of the rectifier is connected to the pipe line 20. The rectifier 53 is connected to a suitable source of AC power and is adapted to rectify the AC power to provide a direct current to the anodes 50. Although a rectifier has been illustrated and described, it is noted that any conventional source of DC power, such as a storage battery or the like, could be used. Also, it is noted that the support line 51 could be omitted in which case the anodes would be supported by the electrical conduits 52.

Each of the anodes 50 preferably is provided with one or more centering devices 54 constructed of any desired material such as mild steel or the like, to maintain the anodes 50 substantially along the vertical axis of the casing 25. Such anodes are lowered into the casing 25 until the lowermost anodes reaches a predetermined position above the base portion 26 of the casing. When the anodes are in position, any desired fluidized carbonaceous material 48, not that of the present invention, is introduced into the casing to fill the interior thereof to a desired level, at least above the uppermost openings 38.

Gravel 55 is preferably introduced into the upper annulus between the bore hole 21 and the casing 25 and above the backfill material 45 located therein. Gravel is not a good conductor of electric current, and therefore, the current discharged by the anodes 50 will not be dissipated to the surface. After the interior of the casing 25 has been filled to the desired level, the support line 51 is connected to the cap 40 and the carbonaceous material 48 is permitted to settle for approximately 24 hours, after which the anodes are energized by the rectifier 53.

Although one procedure has been described for installation of the backfill of the present invention, the invention contemplates that alternative procedures may be employed. Thus, instead of pumping it upwardly from the bottom it may be pumped from a different level in the bore hole. Also, while a procedure according to the Tatum U.S. Pat. No. 3,725,669 has been described for installation of the vertical anode ground bed, it is contemplated that other procedures and variations in apparatus may be used within the limits of operativeness.

Thus, as an illustration of the use of the backfill of the present invention in an alternative environment, reference is made to FIG. 2. In FIG. 2, the bore hole 60 receives a casing having a lower portion 62 which may be of a conductive metal such as steel and an upper portion 63 which is of an inert, non-conductive, thermoplastic material. The anodes 50 are positioned at predetermined levels within the conductive casing portion 62.

The backfill 65 made in accordance with the present invention and which surrounds the casing extends from the bottom of the bore hole upwardly above the region of the uppermost anodes 50.

After a period of operation of the system, the metal pipe portion 62, at least in the regions opposite the anodes 50, will probably corrode away. However, the concrete shell formed by the outer backfill 65 will maintain the stability of the hole and continue to conduct current. The concrete shell will also maintain the stability of the hole to facilitate replacement of the anodes, if required, as described in the Tatum, U.S. Pat. No. 3,725,669.

We claim:

1. In the method of making a deep anode bed for the cathodic protection of underground metallic structures comprising the steps of: drilling a deep bore hole in the earth, inserting an elongated hollow casing having a generally tubular wall of relatively rigid chemically inert nonconductive material into said bore hole, the lower portion of said casing wall having a plurality of openings therethrough, filling the annulus between the bore hole and the exterior of said casing with electrically conductive material to a predetermined level above the bottom of the bore hole and at least above the level of said openings, attaching at least one anode to a support means, introducing said anode and at least a portion of said support means into said casing, filling the interior of said casing with granular electrically conductive material to at least above the level of said openings after said anode is in place so that the conductive material within said casing is in intimate engagement with said anode and communicates with the conductive material exteriorly of said casing through said openings, and electrically connecting said anode to a source of direct electrical energy, whereby electrical energy flows from said anode through said interior and exterior conductive material and through the earth to the metallic structure so that the underground metallic structure becomes cathodic, the improvement comprising filling the annulus between the bore hole and the exterior of said casing with a non-porous cementitious composition, comprising a hydrated mixture of portland cement, sized calcined fluid petroleum coke, micro-carbon rods and carbon black.

2. The method of claim 1 in which the calcined fluid petroleum coke is of a size to pass a Tyler standard number 16 sieve.

3. The method of claim 1 in which the micro-carbon rods have a length of approximately 30 to 600 microns and a diameter of approximately 6 to 14 microns.

4. The method of claim 1 in which the carbon black is of high structure.

5. The method of claim 1 in which the carbon black has a surface area ranging from 200 to 1500 square meters per gram, a structure ranging from 150 to 500 cubic centimeters per 100 grams, and a volatile content ranging from 0.5 to 2.0% by weight.

6. The method of claim 1 in which the mixture is in the following proportions by weight: portland cement 30 to 50%, calcined fluid petroleum coke 50 to 70%, micro-carbon rods 0.05 to 5.0%, and high structure carbon black 0.05 to 5.0%.

7. The method of claim 6 in which the petroleum coke is of a size to pass a Tyler standard number 16 sieve.

8. The method of claim 6 in which the micro-carbon rods are in the range of length of 30 to 600 microns, a diameter of 6 to 14 microns, and a carbon content from approximately 98.5 to 99.8%.

9. The method of claim 6 in which the mean particle size of the carbon particles approximates 30 millimicrons.

10. The method of making a deep anode bed for the cathodic protection of underground metallic structures comprising the steps of: drilling a deep bore hole in the earth, inserting an elongated hollow casing having a generally tubular wall into said bore hole, the upper portion of said casing constructed of substantially rigid inert non-conductive material, the lower portion of said casing formed of substantially rigid conductive material, filling the annulus between the bore hole and the exterior of said casing with a non-porous cementitious composition, comprising a hydrated mixture of portland cement, sized calcined fluid petroleum coke, micro-carbon rods and carbon black to a predetermined level above the bottom of the bore hole substantially commensurate with the lower portion of said casing to form an electrically conductive concrete shell and around the casing, attaching at least one anode to a support means, introducing said anode and at least a portion of said support means into said casing, filling the interior of said casing with granular electrically conductive material after said anode is in place to the extent that the conductive material within said casing is in intimate engagement with said anode and communicates electrically with the conductive shell exteriorly of said casing through said lower portion of said casing, and electrically connecting said anode to a source of direct electrical energy, whereby electrical energy flows from said anode through said interior material and exterior shell and said lower portion of said casing and through the earth to the metallic structure so that the underground metallic structure becomes cathodic.

11. The method of claim 10 in which the calcined fluid petroleum coke is of a size to pass a Tyler standard number 16 sieve.

12. The method of claim 10 in which the micro-carbon rods have a length of approximately 30 to 600 microns and a diameter of approximately 6 to 14 microns.

13. The method of claim 10 in which the carbon black is of high structure.

14. The method of claim 10 in which the carbon black has a surface area ranging from 200 to 1500 square meters per gram, a structure ranging from 150 to 500 cubic centimeters per 100 grams, and a volatile content ranging from 0.5 to 2.0% by weight.

15. The method of claim 10 in which the mixture is in the following proportions by weight: portland cement 30 to 50%, calcined fluid petroleum coke 50 to 70%, micro-carbon rods 0.05 to 5.0%, and high structure carbon black 0.05 to 5.0%.

16. The method of claim 15 in which the petroleum coke is of a size to pass a Tyler standard number 16 sieve.

17. The method of claim 15 in which the micro-carbon rods are in the range of length of 30 to 600 microns, a diameter of 6 to 14 microns, and a carbon content from approximately 98.5 to 99.8%.

18. The method of claim 15 in which the mean particle size of the carbon particles approximates 30 millimicrons.

19. In apparatus for cathodically protecting underground metallic structure having an elongated hollow tubular rigid casing for reception within a deep bore hole, said casing having at least an upper portion constructed of substantially rigid chemically inert nonconductive material with a plurality of openings adjacent to the lower end only, at least one anode, means for suspending said anode within said casing in the area of said openings, first granular electrically conductive material within said casing and intimately engaging said anode, and second granular electrically conductive material filling the lower portion of the bore hole exteriorly of said casing at least to a level above said openings, and means for supplying direct electrical energy to said anode, whereby electrical energy flows from said anode through said first and second conductive materials and through the earth to the underground metallic structure to cause the underground structures to become cathodic and thereby substantially prevent corrosion of such structure, the improvement comprising, said second electrically conductive material comprising concrete formed from a hydrated mixture of portland cement, sized calcined fluid petroleum coke, micro-carbon rods and carbon black.

20. The apparatus of claim 19 in which the calcined fluid petroleum coke is of a size to pass a Tyler standard number 16 sieve.

21. The apparatus of claim 19 in which the micro-carbon rods have a length of approximately 30 to 600 microns and a diameter of approximately 6 to 14 microns.

22. The apparatus of claim 19 in which the carbon black is of high structure.

23. The apparatus of claim 19 in which the carbon black has a surface area ranging from 200 to 1500 square meters per gram, a structure ranging from 150 to 500 cubic centimeters per 100 grams, and a volatile content ranging from 0.5 to 2.0% by weight.

24. The apparatus of claim 19 in which the mixture is in the following proportions by weight: portland cement 30 to 50%, calcined fluid petroleum coke 50 to 70%, micro-carbon rods 0.05 to 5.0%, and high structure carbon black 0.05 to 5.0%.

25. The apparatus of claim 24 in which the petroleum coke is of a size to pass a Tyler standard number 16 sieve.

26. The apparatus of claim 24 in which the micro-carbon rods are in the range of length of 30 to 600 microns, a diameter of 6 to 14 microns, and a carbon content from approximately 98.5 to 99.8%.

27. The apparatus of claim 24 in which the mean particle size of the carbon particles approximates 30 millimicrons.

28. Apparatus for cathodically protecting underground metallic structures comprising an elongated hollow tubular rigid casing for reception within a deep bore hole, said casing having an upper portion constructed of substantially rigid chemically inert nonconductive material and a lower portion of conductive material, at least one anode, means for suspending said anode within said lower portion of said casing, first granular electrically conductive material within said casing and intimately engaging said anode, and second granular conductive hydrated material of portland cement, sized calcined fluid petroleum coke, micro-carbon rods and carbon black forming a concrete annulus around said lower portion of said casing and filling the lower portion of the bore hole exteriorly of said casing at least to a level above said anode, and means for supplying direct electrical energy to said anode, whereby electrical energy flows from said anode through said first and second conductive material and the lower portion of said casing through the earth to the underground metallic structure to cause the underground structure to become cathodic and thereby substantially prevent corrosion of such structure.

29. The apparatus of claim 28 in which the calcined fluid petroleum coke is of a size to pass a Tyler standard number 16 sieve.

30. The apparatus of claim 28 in which the micro-carbon rods have a length of approximately 30 to 600 microns and a diameter of approximately 6 to 14 microns.

31. The apparatus of claim 28 in which the carbon black is of high structure.

32. The apparatus of claim 28 in which the carbon black has a surface area ranging from 200 to 1500 square meters per gram, a structure ranging from 150 to 500 cubic centimeters per 100 grams, and a volatile content ranging from 0.5 to 2.0% by weight.

33. The apparatus of claim 28 in which the mixture is in the following proportions by weight: portland cement 30 to 50%, calcined fluid petroleum coke 50 to 70%, micro-carbon rods 0.05 to 5.0%, and high structure carbon black 0.05 to 5.0%.

34. The apparatus of claim 33 in which the petroleum coke is of a size to pass a Tyler standard number 16 sieve.

35. The apparatus of claim 33 in which the micro-carbon rods are in the range of length of 30 to 600 microns, a diameter of 6 to 14 microns, and a carbon content from approximately 98.5 to 99.8%.

36. The apparatus of claim 33 in which the mean particle size of the carbon particles approximates 30 millimicrons.

* * * * *